United States Patent [19]

Patil

[11] Patent Number: 4,758,415
[45] Date of Patent: Jul. 19, 1988

[54] PROCESS FOR REMOVING SOLUBLE METAL CATIONS IN IRON OXIDE PIGMENTS

[75] Inventor: Arvind S. Patil, Wyoming, Mich.

[73] Assignee: BASF Corporation, Parsippany, N.J.

[21] Appl. No.: 733,009

[22] Filed: May 10, 1985

Related U.S. Application Data

[63] Continuation-in-part of Ser. No. 375,705, May 7, 1982, abandoned, which is a continuation-in-part of Ser. No. 218,862, Dec. 22, 1980, abandoned.

[51] Int. Cl.$^4$ ............................................. C01G 49/06
[52] U.S. Cl. ..................... 423/150; 423/632; 423/633; 106/456; 106/460; 426/431; 426/479; 252/82
[58] Field of Search ............... 106/304; 423/150, 632, 423/633; 426/479, 431; 252/82

[56] References Cited

U.S. PATENT DOCUMENTS

| | | | |
|---|---|---|---|
| 2,904,402 | 9/1959 | Cauterman | 106/304 |
| 3,308,065 | 3/1967 | Lesinski | 252/82 |
| 3,447,965 | 6/1969 | Teumac | 252/82 |
| 3,684,720 | 8/1972 | Richardson | 252/82 |
| 4,129,454 | 12/1978 | Pavonet | 423/633 |
| 4,261,966 | 4/1981 | Portes | 106/304 |

FOREIGN PATENT DOCUMENTS

| | | | |
|---|---|---|---|
| 1023958 | 3/1966 | United Kingdom | 252/82 |
| 1333405 | 10/1973 | United Kingdom | |

*Primary Examiner*—Robert L. Stoll
*Attorney, Agent, or Firm*—William G. Conger

[57] ABSTRACT

The subject matter of this invention relates to a process for removing the soluble metal cations contained in iron oxide pigments comprising washing said iron oxide pigments with a ligand compound having a pH greater than 6.0. The pigments can be used as colorants for substances ingested by man and animals, and they can also be used to stabilize plastics against ultraviolet degradation, and as pigments in base-coat clear-coat automotive finishing operations.

6 Claims, No Drawings

PROCESS FOR REMOVING SOLUBLE METAL CATIONS IN IRON OXIDE PIGMENTS

CROSS-REFERENCE TO RELATED APPLICATIONS

The present application is a continuation-in-part of U.S. Ser. No. 375,705, filed May 7, 1982, now abandoned, which is a continuation-in-part of U.S. application Ser. No. 218,862, filed Dec. 22, 1980, now abandoned, for "Process for Removing Soluble Metal Cations in Iron Oxide Pigments."

BACKGROUND OF THE INVENTION

1. Field of the Invention

The subject matter of this invention relates to a process for removing the soluble metal cations found in opaque or transparent iron oxide pigments. The resulting pigments can be used as colorants in substances which are ingested by human beings and animals, and they can also be used to stabilize plastics against ultraviolet degradation.

2. Description of the Prior Art

Iron oxide pigments are found in nature as mineral deposits. There are three types of iron oxide pigments which are found in nature as mineral deposits. These are limonite, hematite, and magnetite. Limonite is yellow and has a chemical formula of $Fe_2O_3 \cdot xH_2O$ where x is an integer. As can be seen from its formula, it is a hydrated iron(III) oxide. Hematite is red and has a chemical formula of $Fe_2O_3$. It is an anhydrous iron(III) oxide. Magnetite is black and has a chemical formula of $Fe_3O_4$. It is considered to be a spinel containing iron(II) and iron(III) ions.

In addition to the natural mineral deposits, iron oxide pigments can be obtained synthetically. Synthetic methods for preparing iron oxide pigments generally involve the alkali precipitation of iron(II) compounds from a soluble iron(II) salt and the oxidation of the precipitated iron(II) compound to an iron(III) oxide pigment slurry. The pigment produced by such methods corresponds to the yellow hydrated iron(III) oxide described previously. The yellow pigment is recovered from the slurry by filtration, washing, and drying. The alkali precipitation must occur under acidic conditions; otherwise, dark brown or black undesirable color shades will be produced. Iron oxide pigments of various yellow shades can be prepared by controlling the temperature and rate of oxidation. Red, black and other colors can be prepared by calcining the yellow pigments at high temperatures.

Iron oxide pigments which have an average particle size less than 0.1 micron are considered to be transparent because they can transmit visible light. Iron oxide pigments which have an average particle size greater than 0.1 micron and which cannot transmit visible light are considered to be opaque. Generally, naturally occuring iron oxide pigments are opaque.

Whether the iron oxide pigments are mined or manufactured, transparent or opaque, they have high concentrations of soluble metal cations such as antimony, arsenic, barium, beryllium, cadmium, chromium, cobalt, copper, lead, manganese, mercury, nickel, selenium, thorium, tin, and zinc. These soluble metal cations may be present in varying amounts, but in high quality pigments generally do not exceed quantities such that the pigment conductivity as measured by ASTM D-2448-73 exceeds 3000 $\mu$mho.

These soluble metal cations must be distinguished from bulk, insoluble salts. Bulk insoluble salts, such as calcium sulfate and calcium carbonate scales do not generally occur in the preparation of high quality iron oxide pigments. Moreover, when such impurities do occur, they are readily removed by physical methods such as that disclosed in U.S. Pat. No. 2,904,402, or by washing with dilute acid. These treatments, however, are ineffectual in removing soluble metal cations, which are adsorbed onto the surface of the pigment itself.

Due to the fact that these soluble cations are adsorbed onto the pigment surface, the problem is especially acute with regard to the transparent iron oxide pigments, which, due to their small particle size, have enormous surface area. Previous attempts to remove the soluble cations, for example by conventional water washing has produced pigments with conductivities, as measured by ASTM D-2448-73, of from 1500-2000 $\mu$mho's. Extended washing does not serve to lower the conductivity appreciably.

The presence of soluble metal cations greatly restricts the use of iron oxide pigments. They cannot be used as colorants in substances ingested by man and animals, such as food and medicine, because the soluble metal cations will catalyze oxidative reactions which will cause the substances to spoil.

The soluble metal cations will also cause plastics and coatings to degrade. Consequently, iron oxide pigments, which act as stabilizers against ultraviolet radiation of wavelengths between 300 nanometers and 400 nanometers, cannot be used for these purposes, or for use in some of the newer coating systems such as the base-coat/clear-coat. In this process, for example, an initial base-coat of paint containing the pigment is applied, following which a transparent, or clear-coat is applied. This process has the advantage that the pigment is protected against oxidation, and moreover, that minor surface scratches do not remove pigment and are thus more susceptible to successful repair efforts. Unfortunately, if the pigment has any significant level of soluble metal cation impurities, these impurities migrate out of the pigment coat into the interface between the pigment-containing coat and clear-coat, causing the latter to separate. Generally, pigments for this application must have soluble cation impurity levels such that conductivity tests of the leachate, as measured by ASTM D-2448-73 exhibit a conductivity less than about 500 $\mu$mho to be successful, while values of 400 mmho's or less are preferred.

Accordingly, there is a need to develop a method to deactivate or remove the metal cations present in iron oxide pigments in order to expand the application of these pigments. This is particularly so since the iron oxide pigments are suspected of being nontoxic and non-carcinogenic, and could be substituted for many of the organic pigments and dyes which are believed to be toxic and/or carcinogenic.

SUMMARY OF THE INVENTION

A process for removing soluble metal cations contained in iron oxide pigments has been discovered which comprises washing said iron oxide pigments with a dilute solution of ligand compound. This process can be used to remove the soluble metal cations in transparent or opaque iron oxide pigments which are naturally occurring or synthetically manufactured without destroying the coloring properties of the pigments. It can also be used in conjunction with methods which involve the deactivation of soluble metal cations by the addition of alkalizing compounds to iron oxide pigment slurries. The pigments which have been subjected to this process can be used to color substances ingested by human beings and animals, such as food, medicine, vitamins, minerals, and chemicals. Because the soluble metal cations in the iron oxide pigment have been removed, these substances will not oxidize or spoil. They can also be used in plastics as stabilizers against ultraviolet degradation and in automotive base-coat clear-coat painting processes. Furthermore, they are believed to be noncarcinogenic and nontoxic. Because organic colorants, which are widely used to color the foregoing substances, may be carcinogenic or toxic, iron oxide pigments can be used as substitutes for them.

DESCRIPTION OF THE PREFERRED EMBODIMENT

Iron oxide pigment obtained by mining naturally occurring iron oxide or by manufacturing iron oxide pigment in accordance with known processes such as those described in U.S. Pat. Nos. 1,327,061 and 2,558,302, which are hereby incorporated into this application by reference, may be used in the process of this invention. Typically, iron oxide pigments are prepared by alkali precipitation of iron(II) compounds from solutions of water soluble iron(II) salts, and oxidation of the precipitated iron(II) compounds to an iron(III) oxide pigment slurry. The pigment is recovered from the slurry by filtration, washing, and drying. The pH of the system must be maintained in an acidic range during the alkali precipitation and oxidation of the precipitated iron(II) compounds in order to prevent undesirable black or dark brown color shades from being formed. Those of ordinary skill in the art are familiar with these problems and techniques. Following removal of the soluble metal cation impurities, various color shades of iron oxide pigment can be produced by calcining the iron(III) oxide at high temperatures.

In order to remove the soluble metal cations contained in iron oxide pigment, the pigment is washed with a ligand compound, sometimes referred to as a chelating agent. For the purposes of this invention, a ligand compound is a compound other than water which contains one or more electron donor atoms capable of complexing with a metal atom. The ligand compound may be used in either acidic or alkaline media, depending upon the nature of the particular process used to prepare the pigment itself. Representative examples of ligand compounds which can be employed in the process of this invention are ammonia, polyphosphates such as sodium tripolyphosphate, hexametaphosphoric acid; aminocarboxylic acids such as ethylenediaminetetraacetic acid, hydroxyethylethylenediaminetriacetic acid, nitrilotriacetic acid, N-dihydroxyethylglycine, ethylenebis(hydroxyphenylglycine); 1,3-diketones such as acetylacetone, trifluoroacetylacetone, thenoyltrifluoroacetone; hydroxcarboxylic acids such as tartaric acid, citric acid, gluconic acid, 5-sulfosalicylic acid; polyamines such as ethylenediamine, triethylenetetramine, triaminotriethylamine; aminoalcohols such as triethanolamine, N-hydroxyethylethylenediamine; aromatic heterocyclic bases such as dipyridyl, o-phenanthroline; phenols such as salicylaldehyde, disulfopyrocatechol, chromotropic acid; aminophenols such as oxine, 8-hydroxyquinoline, oxinesulfonic acid; oximes such as dimethylglyoxime, salicylaldoxime; Schiff bases such as disalicylaldehyde 1,2-propylenediamine; tetrapyrolles such as tetraphenylporphin, phthalocyanine; sulfur compounds such as toluenedithiol (dithiol), dimercaptopropanol, thioglycolic acid, potassium ethyl xanthate, sodium diethyldithiocarbamate, dithizone, diethyl dithiophosphoric acid, thiourea; synthetic macrocyclic compounds such as dibenzo[18]crown-6, [2.2.2]-cryptate, polymeric compounds such as polyethylenimine, polymethacryloylacetone, poly(p-vinylbenzyliminodiacetic acid); and phosphonic acids such as nitrilotrimethylenephosphonic acid, ethylenediaminetetra-(methylenephosphonic acid), hydroxyethylidenediphosphonic acid. Preferably used are ammonia, nitrilotriacetic acid, and ethylenediaminetetracetic acid, acetylacetone, and polyphosphates.

As was previously mentioned, the present process of removing soluble cation impurities may be used in conjunction with processes for deactivating the soluble metal cations in iron oxide pigments. In order to deactivate the soluble metal cations contained in the iron oxide pigment, an alkalizing compound is added to an iron oxide pigment slurry. An iron oxide pigment slurry is a mixture of iron oxide pigment and a liquid. If dried iron oxide pigment is used, a slurry can be made by adding water or other liquids to the iron oxide pigment. If the iron oxide pigment is prepared in accordance with any of the processes described in the prior art, the alkalizing compound is preferably added while the iron(III) oxide pigment is still in a slurry state, before washing, filtering, and drying. As was previously mentioned, the preparation of iron oxide pigment according to the processes disclosed in the prior art is carried out under acidic conditions; otherwise, black or dark brown color shades of pigment are produced. The ligand compound may advantageously be added at this stage in an amount generally at from about 0.1% to about 5% by weight of the pigment, generally approximately 2% by weight.

Applicant has discovered that a second alkali precipitation can be performed after oxidation of the iron(II) compound to the iron(III) oxide. This second alkali precipitation will at least partially deactivate the metal cations which remain in the pigment, but it will not cause black or brown color shades to be produced even though the pH of the system will eventually exceed 12.

Representative examples of alkalizing compounds which can be used to add to the iron oxide pigment slurry include bases such as sodium hydroxide, potassium hydroxide, sodium carbonate, potassium carbonate, sodium bicarbonate, and potassium bicarbonate. These compounds are preferably dissolved in solvents such as water to form solutions. The concentration of the alkalizing compound in the solution is preferably 10 percent to 95 percent by weight relative to the liquid solvent.

While the alkalizing compound is being added to the pigment slurry, the slurry is oxidized. Oxidation can be performed in any suitable manner. One method is by aeration which involves spraying the pigment slurry from a perforated pipe into the air. Another method is by bubbling air or a mixture of oxygen and an inert gas through the pigment slurry. If this method is used, it may be preferable to agitate, shake, or stir the pigment slurry while the air or mixture of oxygen and inert gas is bubbled into the slurry. Another method of oxidizing is by using a chemical oxidizing agent such as hydrogen peroxide or other chemical oxidants which will provide oxygen but will not (as potassium permaganate or sodium dichromate would) impart any color to the solution. It is generally not practical to effectuate the oxidation by allowing the slurry to stand while exposed to the air or atmospheric oxygen.

The alkalizing compound is added gradually until the pH of the solution is greater than 12. The rate at which it is added will depend upon the concentration of the alkalizing compound and the quantity of the pigment slurry to be neutralized. If the concentration of the alkalizing compound increases, the rate of addition should decrease. If the quantity of the slurry to be neutralized increases, the rate of addition can be increased. After the pigment slurry reaches the desired pH, the ligand compound may be added in the wash medium. Following this treatment, the iron oxide pigment is recovered by filtration or other means. The pigment can then be dried and milled. It may also be calcined at high temperatures to produce different color variations.

The resulting pigments are essentially free of soluble metal cations. The pigments can be used to color substances ingested by man and animals such as foods, medicines, vitamins, minerals, carbohydrates, fats, proteins, and chemicals. The pigments are mixed with these substances during processing. The amount of pigment added will depend upon the shade and brilliancy of the color wanted.

The pigments can also be added to thermoplastic or thermosetting polymers to stabilize the polymer against ultraviolet radiation. Examples of thermoplastic polymers which can be stabilized against ultraviolet degradation by adding iron oxide pigments prepared in accordance with this invention are polysulfones, polyesters, polystyrenes, cellulose eters, acrylics, polyamides, and polyolefins. Examples of thermoset polymers which can be stabilized against ultraviolet degradation by adding iron oxide pigments prepared in accordance with this invention are acrylic, alkyd, and urethane polymers. Only small amounts, from 0.005 to 0.05 percent by weight of the plastic, are needed for this purpose. They can be added for this purpose in combination with other colorants, or may constitute the colorant itself.

The examples which follow provide details which will enable those of ordinary skill in the art to practice this invention. All parts are by weight unless otherwise indicated. Conductivity measurements, where given, were measured as per ASTM D-2448-73, "Standard Method of Test for Water Soluble Salts in Pigments by Measuring the Specific Resistance of the Leachate of the Pigment".

EXAMPLE 1

Iron oxide pigment produced by alkali precipitation and oxidation was filtered and washed repeatedly with a 2 percent solution of ammonia. The yellow pigment was then dried and part of it was calcined to convert it to a red pigment. The red and yellow pigments were then milled. A slurry of the pigment and deionized water was analyzed by atomic absorption spectroscopy. The level of soluble metal cations present was estimated to be less than 1 ppm.

EXAMPLE 2

A 200 gallon tank of iron oxide pigment slurry produced by alkali precipitation and oxidation was agitated with air while a ten percent NaOH solution was added at the rate of 5 milliliters to 10 milliliters per minute. The pH was monitored occasionally until a pH of 12.3 was reached. The pigment was then filtered, washed, dried and milled. The color of the pigment was yellow. Part of the yellow pigment was calcined and milled to produce red pigment.

EXAMPLE 3

The iron oxide pigment prepared in accordance with Example 2 was filtered and washed with 2 percent ammonia. It was then dried and milled. Part of this yellow pigment was calcined before milling to produce red pigment. A slurry of the pigment and deionized water was analyzed by atomic absorption spectroscopy. The level of soluble metal cations present was estimated to be less than 1 ppm.

EXAMPLE 4

Example 3 was followed except a 1 percent nitrilotriacetic acid solution adjusted to a pH of 10.5-11 was used to wash the pigment. A slurry of the pigment and deionized water was analyzed by atomic absorption spectroscopy. The level of soluble metal cations present was less than 1 ppm.

EXAMPLE 5

An iron oxide pigment prepared conventionally was washed with tap water. The conductivity as measured by ASTM D-2448-73 was found to be 1100 $\mu$mho. The pigment was then subjected to further extensive washing using approximately three times the normal volume of wash water. The conductivity was 850 $\mu$mho. No further improvement was possible with further washing.

EXAMPLE 6

250 grams of conventionally prepared pigment as used in Example 5 was filtered and washed with 4 liters of an alkaline solution of nitrilotriacetic acid (NTA) having a pH of 11 and containing 1.25 g/l of NTA. The conductivity of the pigment as measured by ASTM D-2448-73 was 300 $\mu$mho.

EXAMPLE 7

An iron oxide pigment was prepared in the conventional manner, as was used to prepare the pigment of Example 5. The pH of the pigment slurry before washing but after oxidation to Fe(III) was 4.5. Nitrilotriacetic acid in an amount of 2.0 percent by weight based on the weight of pigment was added to the pigment slurry following which the temperature was raised to 80°-90° C. The hot pigment slurry was filtered and the pigment filter cake washed and processed as usual. The conductivity, as measured by ASTM D-2448-73, was 210 $\mu$mho.

Example 1 illustrates the process for removing soluble metal cations from iron oxide pigments by washing the pigment with a ligand compound. Examples 2-4 illustrate the use of this process in conjunction witn washing the pigment with an alkalizing compound to deactivate the soluble metal cations. Example 5 indicates that prolonged conventional water washing is insufficient to lower the conductivity to below the 1000-1500 $\mu$mho range. Examples 6 and 7 indicate the improvements over conventional water washing which can be achieved by washing the pigment under either alkaline or acidic conditions by including a ligand compound within the scope of the invention.

The embodiments of this invention in which an exclusive privilege or property is claimed are defined as follows:

1. A process for removing soluble metal cations contained in transparent iron oxide pigments comprising washing said iron oxide pigment with a composition containing a ligand compound wherein said pigment after said washing has conductivity of less than about 500 μmho, wherein the quantity of said ligand compound is from about 0.1 to 5.0 percent by weight relative to the total pigment weight.

2. A process for removing soluble metal cations contained in transparent iron oxide pigments comprising washing said iron oxide pigment with a composition containing a ligand compound wherein said pigment after said washing has conductivity of less than about 300 μmho, wherein the quantity of said ligand compound is from about 0.1 to 5.0 percent by weight relative to the total pigment weight.

3. A process for removing soluble metal cations contained in transparent iron oxide pigments comprising
   A. adding, while oxidizing, an alkalizing compound to iron oxide pigment slurry until the pH of the pigment slurry is greater than 12;
   B. washing said iron oxide pigment with a composition containing a ligand compound, and
   C. separating the iron oxide pigment from the liquid phase of the slurry, wherein said pigment after said washing was conductivity of less than about 500 μmho, wherein the quantity of said ligand compound is from about 0.1 to 5.0 percent by weight relative to the total pigment weight.

4. A process for removing soluble metal cations contained in transparent iron oxide pigments comprising
   A. adding, while oxidizing, an alkalizing compound to iron oxide pigment slurry until the pH of the pigment slurry is greater than 12;
   B. washing said iron oxide pigment with a composition containing a ligand compound, and
   C. separating the iron oxide pigment from the liquid phase of the slurry, wherein said pigment after said washing was conductivity of less than about 300 μmho, wherein the quantity of said ligand compound is from about 0.1 to 5.0 percent by weight relative to the total pigment weight.

5. The process of claims 1, 2, 3, or 4 wherein the ligand compound is selected from the group consisting of ammonia, nitrilotriacetic acid, and ethylenediaminetetracetic acid.

6. In a process for preparing transparent iron oxide pigments comprising the alkali precipitation of iron(II) compounds from a solution of soluble iron(II) salt and oxidation of the precipitated iron(II) compound to an iron(III) oxide, the improvement which comprises washing said iron oxide pigments with a composition containing a ligand compound, wherein the quantity of said ligand compound is from about 0.1 to 5.0 percent by weight relative to the total pigment weight.

* * * * *